July 9, 1929.                A. EBEL                1,719,879

ELECTRICAL CONDENSER

Filed Feb. 17, 1927

Inventor:
Arthur Ebel,
by *Alexander F. Smith*
His Attorney.

Patented July 9, 1929.

1,719,879

UNITED STATES PATENT OFFICE.

ARTHUR EBEL, OF NEUBABELSBERG, GERMANY, ASSIGNOR TO GENERAL ELECTRIC COMPANY, A CORPORATION OF NEW YORK.

ELECTRICAL CONDENSER.

Application filed February 17, 1927, Serial No. 169,076, and in Germany March 12, 1926.

My invention relates to electrical condensers. More in particular, it relates to improvements in condensers of the adjustable type, such as are especially adapted for use in radio work.

As is well known, the plates in condensers of this sort should be set exactly parallel to each other and kept in that position permanently. To do this effectively and economically is quite a problem.

Figure 1:
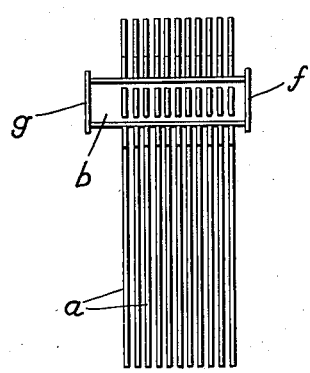
Figure 2:
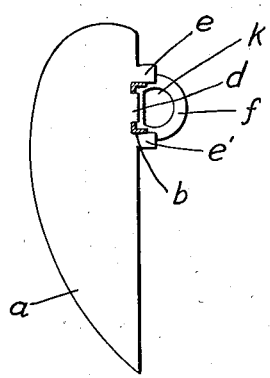
Figure 4:
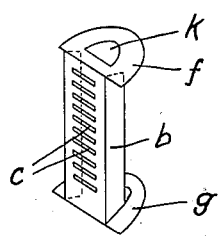
Figure 3:
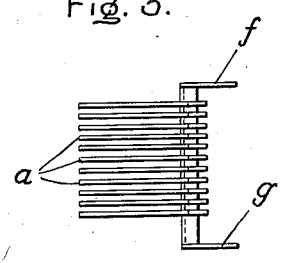
Figure 5:
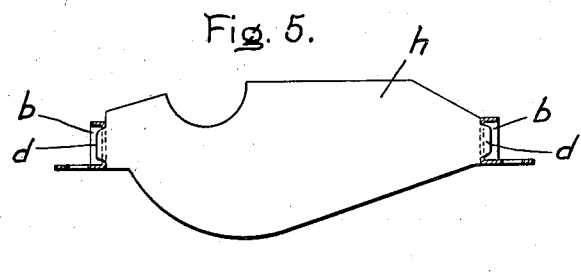
Figure 6:
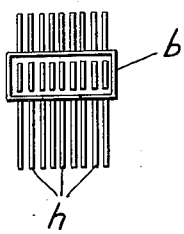
Figure 7:

The invention, therefore, relates to an arrangement by which the movable as well as the stationary plates of the condensers are secured substantially, permanently and effectively in position. It is also an object to provide a construction which is comparatively inexpensive. The invention is hereinafter more fully set forth and claimed, reference being had to the accompanying drawing in which Fig. 1 is a side view of the rotor element of the condenser; Fig. 2 is a top view of the same; Fig. 3 is a side view of the same; Fig. 4 is a view in perspective of one of the casings or supports for the condenser plates; Fig. 5 is a top view of the stator element of the condenser; Fig. 6 is an end view thereof; and Fig. 7 is a side view thereof.

As shown in the drawing, Figs. 1 through 4, the condenser plates $a$ are carried by a casing $b$ which latter is provided with slots $c$ into which the plates are inserted. For this purpose each plate is provided with lips or projections $d$. Also the plates are provided each with one pair of additional auxiliary projections or lips $e$ and $e'$ which embrace the casing $b$ on its sides as indicated in Fig. 2. The ends of casing $b$ are bent over to form flanges $f$ and $g$ which latter are provided with openings $k$ that preferably correspond to the cross section of the casing supporting element (not shown). In the case of the rotor, this supporting element corresponds to the shaft. In the form of construction illustrated in the drawing, it is assumed that the rotor shaft is not round but flattened on one side, see Figs. 2 and 4. Obviously, the supporting element may be of any suitable shape in cross section, for example, square. By means of the flanges $f$ and $g$ the movable set of plates may be slipped in place on the shaft. The plates $a$ are fixed in the casing $b$ by inserting the plate projections $d$ into the slots $c$. The plates may be secured to the casing as, for example, by soldering or casting, or the like. Obviously, when the soldering or casting material becomes set, the plates become firmly and metallically secured to the casing. If necessary, the adjustable plates $a$ can furthermore be reinforced by means of a second casing similarly slotted, the latter casing being arranged of course away from the axis of rotation.

The stationary plates $h$ are joined together in the same manner as the movable plates. For the stationary plates, however, it is expedient to use at least two casings $b$ to which the plates $h$ are fastened by means of the projections $d$ and subsequent casting. In order to fix the set of plates, the casings are fitted with holding flanges $i$.

It will be seen therefore that I provide means for effectively dovetailing the plates and their support together to make the plates substantially rigid with respect to each other. By the term dovetailed I mean of course a projection from one element extending into an opening or cut in the other element. With the form of construction shown in Fig. 2 a substantial, rigid unit structure of the rotor results which may be slipped as a unit off and on the shaft. It will be seen that the lips or heels $e$ and $e'$ extend along the sides $b$ of the sleeve or casing. Therefore, the rotor plates are locked against rotation. The opening $k$, through which the shaft passes, is preferably in the form of a segment in order to prevent the casing or sleeve from rotating on the shaft after it has been slipped on the shaft.

It will be understood that while I have elected to illustrate my invention in connection with certain specific forms, I do not wish to be so limited inasmuch as, in view of the disclosure, variation will be readily suggested without departing from the spirit of the invention or the scope of the claims contained herein.

What I claim as new and desire to secure by Letters Patent of the United States, is:

1. In an adjustable condenser, a stator and a rotor, said rotor having a plurality of parallel plates and a casing for supporting said plates, said casing being formed with a head at each end, each head being integral with said plate and extending in a plane perpendicular to the face of said plate, said casing having also sides between said heads integral with said plate and extending transverse the face of the plate, said ends being provided each with an opening, said openings having a common axis parallel to said face for receiving a shaft, said casing being provided with parallel slots, each plate being provided with a projection inserted in one of said slots for holding the plate, each plate being also provided with auxiliary projections serving as heels, one on each side of said first projection between which said casing is held, each auxiliary projection extending along one of said sides of the casing, whereby the plates are held in spaced relation and locked against turning.

2. In an adjustable condenser, a stator and a rotor, said rotor having a plurality of parallel plates and a casing for supporting said plates, said casing being formed with a head at each end, each head being integral with said plate and extending in a plane perpendicular to the face of said plate, said casing having also sides between said heads integral with said plate and extending transverse the face of the plate, said heads being provided each with an opening, said openings having a common axis parallel to said face for receiving a shaft, said casing being provided with parallel slots, each plate being provided with a projection inserted in one of said slots for holding the plate, each plate being also provided with auxiliary projections serving as heels, one on each side of said first projection between which said casing is held, each auxiliary projection extending along one of said sides of the casing, whereby the plates are held in spaced relation and locked against turning, said openings in the heads being each in the form of a segment whereby the casing is prevented from rotating on the shaft, said casing and said rotor plates being soldered together along the face of the casing and along the sides of the casing to form a rigid unit structure which may be slipped on and off of the shaft as a sleeve.

3. In a condenser, a rotor having a plurality of plates, a frame casing for supporting said plates in position, said frame consisting of a plate element having four sections transverse the face of said element, two of the sections forming a pair of heads located opposite and parallel to each other and the other two sections forming a pair of sides located opposite and parallel to each other between said heads, said heads being provided each with an opening, said openings having a common axis extending parallel to said face of the frame plate whereby a rotor shaft may be inserted through said openings, said face being provided with a plurality of slots, one for each rotor plate, each rotor plate being provided with a main projection inserted in one of said slots, each rotor plate being provided also with a pair of auxiliary projections, one on each side of the main projection and each extending along one of said sides of the casing frame, whereby the rotor plates are held in spaced relation and locked against turning in the casing.

In witness whereof, I have hereunto set my hand this 22nd day of January, 1927.

ARTHUR EBEL.